United States Patent [19]

Woodbridge

[11] 4,453,079
[45] Jun. 5, 1984

[54] IRRADIATOR APPARATUS AND METHOD

[75] Inventor: David D. Woodbridge, West Palm Beach, Fla.

[73] Assignee: Radiolysis, Incorporated, Kirkland, Wash.

[21] Appl. No.: 343,530

[22] Filed: Jan. 28, 1982

[51] Int. Cl.³ .............................................. B01J 19/08
[52] U.S. Cl. .................................. 250/432 R; 250/436; 250/435
[58] Field of Search ............... 250/438, 437, 436, 435, 250/432 R, 428

[56] References Cited

U.S. PATENT DOCUMENTS 3,671,741  6/1972  Woodbridge et al. ............. 250/436
3,865,734  2/1975  Woodbridge ...................... 250/435 X

*Primary Examiner*—Alfred E. Smith
*Assistant Examiner*—Jack I. Berman
*Attorney, Agent, or Firm*—William M. Hobby, III

[57] ABSTRACT

An irradiator of the type using a radioactive material as a source of radiation is combined with a gaseous liquid contact chamber. The irradiator has a casing having an input and output therefrom and a plurality of connected chambers formed in the casing and separated by walls having an opening therethrough. A plurality of gamma radiation sources are located in a plurality of the chambers, thus forming a plurality of irradiation chambers. At least one of the chambers is a gas treatment chamber having a gas input line connected thereto to provide gas liquid contact in the gas treatment chamber. The walls between the irradiation chambers and the gas treatment chambers are made of a gamma radiation blocking material, such as lead or concrete. Gas escape lines are provided for preventing the build up of gas in the chambers, so that a fluid can be treated through a series of irradiation gas contact treatments. Gas lines can also be provided directly into the irradiation chambers. Gases such as ozone, oxygen, air and chlorine may be utilized for the liquid gas contact treatment. A method is provided for the irradiator to irradiate fluid from an output of an industrial process to produce gas and liquid streams from the molecular dissociation of a portion of the waste fluid, then to collect the streams from the molecular dissociation of the waste and feed the collected streams from the molecular dissociation back into the production chain process of the industrial plant producing the waste, so that a portion of the waste can be reused by the industrial plant.

17 Claims, 6 Drawing Figures

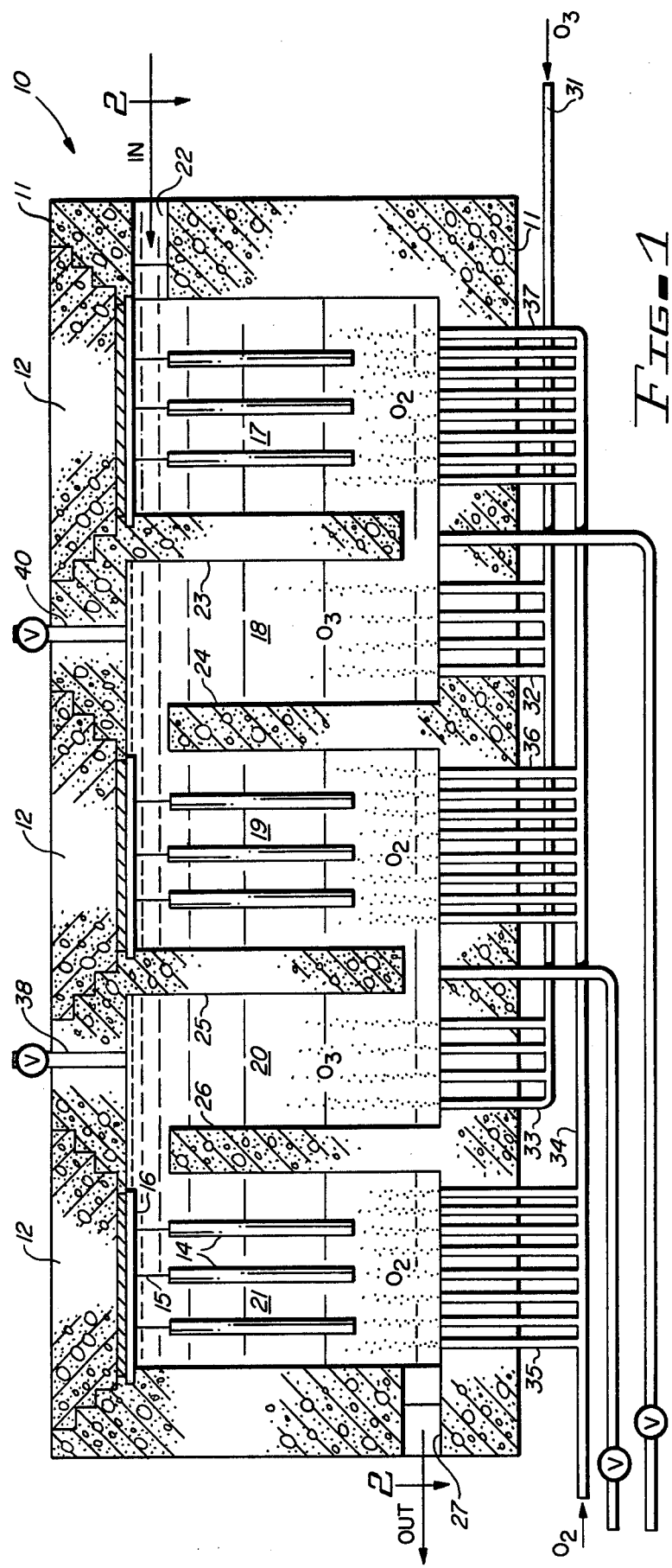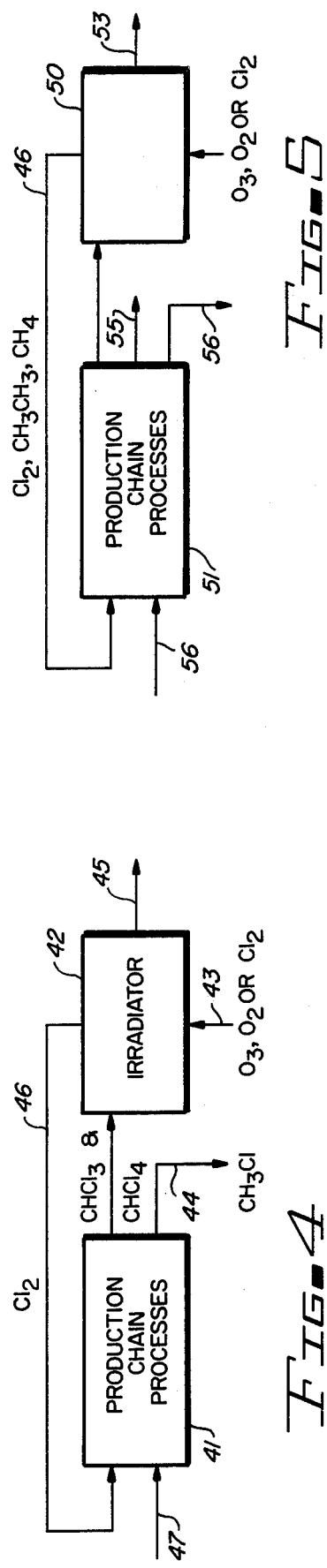

IRRADIATOR APPARATUS AND METHOD

BACKGROUND OF THE INVENTION

The present invention relates to a fluid treatment apparatus and method for treating industrial waste, or the like, and also for treating the waste with a predetermined liquid/gas contact in a series of treatments in the irradiator.

The importance of chemical contamination of fluids has become a significant factor in the handling and disposal of waste fluids. Chemicals that occur in water following conventional treatment are known to be dangerous to human health. New methods are needed to destroy the chemical structures of toxic materials that occur in water and other fluids. The present method uses a combination of ozone ($O_3$), oxygen ($O_2$) and gamma ray ($\gamma$)irradiation to destroy the molecular structure of both chemical and biological toxic materials in fluids.

Previous irradiation patents have been primarily directed at destroying biological organisms within fluids. The present concept utilizes the combination of ozone ($O_3$), oxygen ($O_2$) and gamma rays ($\gamma$) to break up the molecular structure of toxic chemicals and simultaneously destroy other biological organisms. However, to accomplish this objective, the ozonation aspects of the process must be shielded from the gamma rays. For certain toxic materials, it will be more effective to use chlorine ($Cl_2$) rather than ozone ($O_3$).

In experimental work performed during the past several years, it has been found that a sequential series of ozonation and irradiation was much more effective than just doubling the ozonation and/or irradiation. Thus, the apparatus must be designed to incorporate a sequential ozonation and irradiation which cannot occur in the same chambers because of the weak bond of the third oxygen atom which is immediately broken by the irradiation. The ozonation chamber must also be shielded by lead, concrete, or some other material to allow an interaction between the ozone ($O_3$) and the toxic materials without strong gamma ray ($\gamma$) irradiation.

In addition to the ozone ($O_3$) or chlorine ($Cl_2$) treatment in sequence with the irradiation, oxygen ($O_2$) has been found to be an effective synergistic agent when used simultaneously with the gamma ray ($\gamma$) irradiation. Thus, a hydrodetoxification system must also include the injection of oxygen ($O_2$) or air into the irradiation chamber.

Decomposition of water and other fluids by gamma rays has been known to exist for many years. However, many of the observed results were difficult to explain until the hydrated electron was postulated in the early 1950's. Gamma rays ($\gamma$) from both cobalt-60 and cesium-137 have energies so great that they both ionize and excite many liquid molecules along their path, as shown in the following equations:

$$H_2O + \gamma \rightarrow H_2O^+ + e^-_s$$
$$H_2O + \gamma \rightarrow H_2O^*$$

The electron removed from the water molecule has energy of a magnitude such that is also ionizes and excites other fluid molecules. As the electron loses energy, it becomes subexcitable, then thermal, and finally hydrolyzes in about $10^{-11}$ seconds as shown in the equation below:

$$e^-_s \rightarrow e^-_{se} \rightarrow e^-_t \rightarrow e^-_{aq}$$

The positive water or other fluid ions also react with other water or fluid molecules. In water, a hydroxyle free radical is formed as shown in the following equation:

$$H_2O^+ + H_2O \rightarrow H_3O + OH^\circ$$

During this same period of time, the excited water molecules decompose into hydrogen free radicals and hydroxyle free radicals as shown in the equation below:

$$H_2O^* \rightarrow H^\circ + OH^\circ$$

These three reactive species $e^-_{eg}$ $H^\circ$ and $OH^\circ$ are produced by the irradiation of water and other fluids and result in the decontamination of the fluid. Secondary effects within the fluids also result in the production of hydrogen peroxide, free hydrogen, peroxyle free radicals, and other ions. These secondary species increase the effectiveness of the irradiation to decompose toxic chemicals and biological materials.

Addition of oxygen or a halogen, such as chlorine, to a fluid during irradiation greatly increases the production of hydrated electrons and other reactive ionic species. Positive synergistic effects have been experimentally found to exist when specific materials were added to a fluid just prior to or during irradiation.

In addition to the primary effect of the gamma rays on chemicals contaminants and the secondary effects of the hydrated electrons and reactive ions, the gamma rays produce ultraviolet radiation throughout a large volume surrounding the cobalt-60 or cesium-137. When cobalt 60 or cesium-137 is placed in an aqueous environment, Cherenkov radiation is observed. This radiation is produced by electrons that have been knocked off the water molecules and possess a velocity greater than the velocity of light in the aqueous solution. The electrons produce a "bow-wave" of light or radiation that is primarily of the ultraviolet frequency. This "bow-wave" is similar to the "shock-wave" of a super sonic jet plane.

Because of the difference in the particle velocity and the phase velocity of light in the medium, there is no longer complete destructive interference and the electron radiates. This radiation is mostly in the ultraviolet part of the spectrum. However, when one sees Cherenkov radiation, they see only the blue tail of the radiated spectrum. The ultraviolet radiation is thus produced within the medium itself and the problem of minimal depth of penetration from an exterior UV source is eliminated. All of the detoxification and disinfection properties of ultraviolet radiation is obtained throughout the volume of the irradiator.

The present method and apparatus incorporates the combined effects of irradiation and ozonation to destroy both chemical and biological toxic materials. This method also uses the synergistic effects of ozone, oxygen, nitrogen, air, or any of the halogens to increase the effectiveness of the irradiation process.

Prior irradiators may be seen in my prior U.S. patents and especially to U.S. Pat. No. 3,865,734 for an Irradiator Apparatus which utilizes an irradiator having an irradiation source therein along with means to feed various gases into the irradiator. The gases suggested in this patent are chlorine, ozone and oxygen based upon my research. The present invention incorporates a number of significant improvements over my prior irradiator in U.S. Pat. No. 3,865,734. Improvements include the separation into a series of chambers to take advantage of the fact that irradiation is more effective in a series of irradiation treatments of the fluid. This is useful because radiation sources having a lower level of radiation, such as spent fuel from nuclear plants, can be effectively utilized in the irradiator. This allows the use of what would otherwise be waste nuclear sources. In addition, the ozonation and irradiation cannot occur in the same chamber because of the weak bond of the third oxygen atom which breaks down by the irradiation, thereby reducing the effectiveness of using ozone in the same chamber as the irradiation. Thus, one or more ozone chambers are provided which are shielded by lead, concrete, or some other material such as spent uranium, to reduce the effect of the radiation on the ozone during the liquid/gas contact with the ozone.

It has been found that irradiation in accordance with the irradiator of the present invention can dissociate chemicals such as carbon tetrachloride ($CCl_4$) and chloroform ($CHCl_3$) to free the chlorine atoms or to free the chlorine, ethane and methane from chlorinated phenolic waste and that these gases can then be reused in a production chain process such as in the production of polyvinyl chloride (PVC) to recapture part of the waste while detoxifying the carbon tetrachloride, chloroform and other wastes.

SUMMARY OF THE INVENTION

An irradiator apparatus is provided having a casing having an input thereinto and an output therefrom. The irradiator casing has a plurality of connected chambers formed therein by walls formed in the casing. Gamma radiation sources are located in a plurality of the chambers forming a plurality of irradiation chambers. The chambers formed in the casing also include at least one gas treatment chamber, especially for the gas/liquid contact of ozone with the treated fluid. The gas treatment chamber has walls between the gas treatment chamber and adjacent irradiation chambers built of a gamma radiation blocking material, such as lead or concrete. A gas input line is connected to the gas treatment chamber for feeding a gas such as ozone thereinto, preferably through a plurality of openings to provide a greater gas/liquid contact. Gas escaping and capturing means are provided for allowing the escape of gas from the gas treatment chamber, and from the irradiation chambers. The irradiation chambers may also have gas inputs for gases such as chlorine, oxygen, or air. The gas captured from the irradiator apparatus can then be reacted with other materials for use in industrial process. The irradiator may also have sample and drain lines connected to the bottom thereof.

A method is provided for the treatment of an industrial waste fluid, including the irradiation of the fluid from the output of an industrial process to produce a gas from the molecular dissociation of the waste fluid, then collecting the gas from the molecular dissociation of the waste and feeding the collected gas from molecular dissociation of the waste back into the production chain process from which the industrial waste was received so that a portion of the industrial plant waste can be reused.

BRIEF DESCRIPTION OF THE DRAWINGS

Other objects, feartures and advantages of the present invention will be apparent from the written description and the drawings, in which:

FIG. 1 is a side sectional view of an irradiator in accordance with the present invention;

FIG. 4 is a block diagram of an irradiation process;

FIG. 5 is a block diagram of a second embodiment of an irradiator process utilizing industrial waste.

DESCRIPTION OF THE PREFERRED EMBODIMENTS

Figure 2:
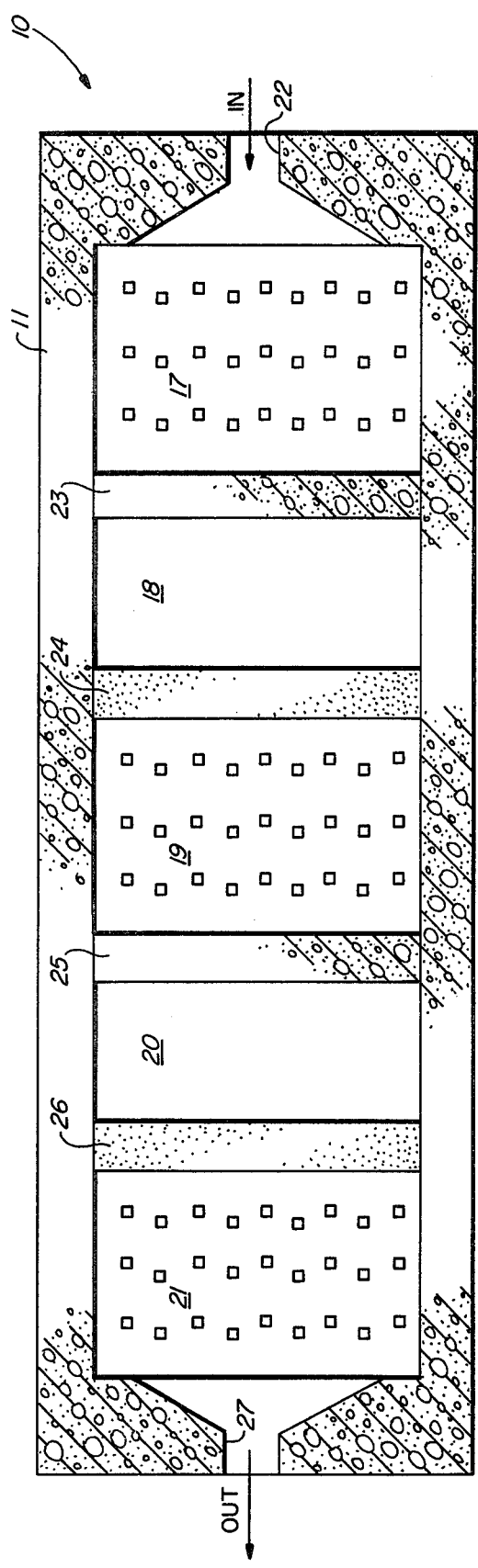
FIG. 2 is a top sectional view of the irradiator in accordance with FIG. 1.
Figure 3:
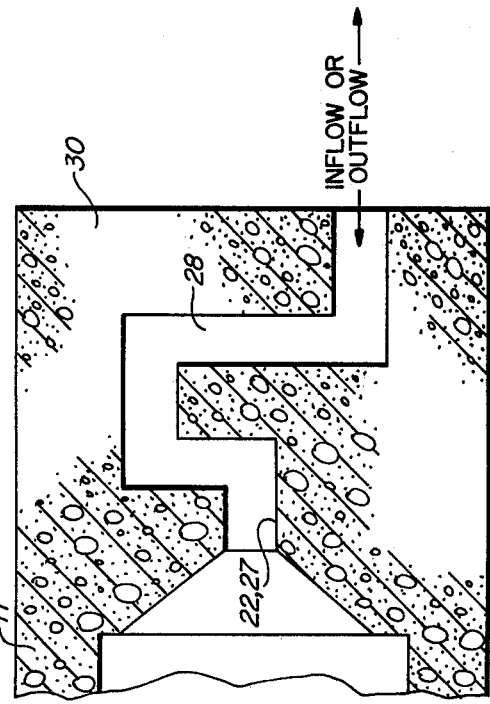
FIG. 3 is a sectional view taken through the output of an irradiator in accordance with FIGS. 1 and 2.

Referring to FIGS. 1 through 3 of the drawings, an irradiator 10 has combined therewith a plurality of liquid/gas contact chambers. The irradiator 10 has a casing 11 which is made of an irradiation shielding material, such as thick concrete and has a lid 12 to each of the irradiation chambers which lids are also of a shielded material and each has a plurality of steps 13 for fitting a plurality of step ledges to block the escape of radiation from the radiation sources. A plurality of radiation sources are held in pencil shaped hangers 14 supported by a hanger wire 15 connected by a holding bar 16 mounted in the concrete casing 11. The embodiment shown has five (5) chambers 17, 18, 19, 20 and 21. Chamber 17 is an irradiation chamber having a plurality of sources 14 and is connected to the inlet 22 while chambers 18 and 20 are gas contact chambers and are separated from the irradiation chambers 17, 19, and 21 by gamma radiation blocking walls 23, 24, 25 and 26. Walls 23 through 26 may be made of lead, thick concrete, spent uranium, or other material for blocking gamma radiation from the gamma radiation sources 14. The gamma radiation sources will typically be cobalt-60 or cesium 137 and may be obtained from the waste from nuclear power plants, or the like. at a relatively low cost while using otherwise difficult to dispose of nuclear waste. The industrial waste fluid entering the inlet 22 passes through the chamber 17, through the passageway at the bottom of wall 23, into the liquid/gas contact chamber 18, over the wall 24, through the chamber 19, under the wall 25, through the chamber 20, over the wall 26 and through the chamber 21 and out the outlet 27.

The inlet and outlet to the irradiator 10 may be shaped the same as shown in FIG. 3 having a serpentine shaped passageway 28 passing through shielding concrete or other material 30, to prevent the leakage of gamma radiation which travels in a straight line and thus would not pass through the channel 28. The gas input line 31 may carry ozone through the bottom or sides of the casing 11 and into the bottom of chambers 18 and 20 and may have a plurality of pipes 32 connecting the line 31 to the chamber 18 and a plurality of lines 32 connecting the line 31 to the chamber 20. The use of a plurality of lines gives a greater surface contact between the gas and the liquid in the contact chambers 18 and 20. Thus, by feeding ozone into chambers 18 and 20, the synergistic effect of the use of the ozone with gamma radiation is obtained without the ozone being destroyed by the gamma radiation which is blocked by the walls 23, 24, 25 and 26. A gas input line 34 may be used for feeding oxygen or chlorine or another halogen gas and is connected through a plurality of gas lines 35 into chamber 21 through a plurality of gas lines 36 into a radiation chamber 19 and through a plurality of lines 37 into radiation chamber 17. Thus, gases which are not damaged by the radiation may be fed directly into the irradiation chambers while gases such as ozone, which are rapidly broken up, can be fed into separate shielded chambers 18 and 20. In addition, it has been found that a series of radiation treatments such as in the present irradiator, is more beneficial in the detoxification of chemicals than a single chamber. A pair of gas bleed lines 38 and 40 are positioned over liquid/gas contact chambers 18 and 20 to collect the build up of gas being fed from pipe 31 and also to collect the build up of gas that may be fed through the pipe 34 into chambers 21, 19 and 17. In addition, the irradiation and treatment of certain chemicals produces a dissociation of the chemicals and will degrade, for instance, carbontetrichloride and chloroform to release the chlorine atom from aqueous solutions and will also degrade chloroamines phenols, surfactants, cyanides and p-benzoquinones, as well as disinfecting the fluid. The combination of the treatment of the fluid with ozone, oxygen or chlorine in combination with irradiation has been shown to produce a synergistic effect which allows the use of smaller doses of irradiation for a much quicker degradation of the chemicals in the fluid; which is thus especially effective in the treatment of industrial wastes, but can also be utilized in the treatment of other waste materials, such as sewage effluent, and for the treatment of potable water. It should be noted that the irradiator 10 gas escape ports 38 and 40 are positioned above the chambers 18 and 20 to avoid the escape of gamma radiation. However, it should also be clear that additional ports can be utilized for collecting larger volumes of gas produced by the irradiation, causing molecular dissociation.

Turning now to FIG. 4, a process utilizing the irradiator shown in FIGS. 1 through 3 is illustrated in a flow diagram in which a production chain process 41, such as found in industrial plants and in particular in the production of polyvinyl-chlorides (PVC), produces large amounts of chemical waste. In a PVC plant, large amounts of chloroform and carbontetrachloride in aqueous solution is produced. These may be fed into irradiator 42 which may be similar to the ones shown in FIGS. 1 through 3 having a gas line input 43 for feeding ozone, oxygen, air or chlorine into the irradiator. The production chain process 41 normally has an output of methylene chloride (Ch₃Cl) at output 44. The irradiator has a fluid output at 45 with the remaining treated fluid and produces a gaseous output of chlorine which is fed to a feedback line 46 back into the production chain process 41, where it is mixed with the reactant materials coming in at 47.

Polyvinyl-chloride (PVC) is manufactured by agitating a mixture of the vinyl chloride monomer with a free radical initiator and water at 62°–75° F. and 100–200 psi to yield the product. The initiators are compounds such as peroxydicarbonates and azos and are recycled to an extent in the process. The significant step of the production chain to this process is the formation of the vinyl chloride monomer (VCM). This precursor is almost uniformily made by the reaction of ethylene and chlorine gas to yield 1, 2 dichloroethane:

$$CH_2=CH_2=Cl_2 \rightarrow ClCH_2-CH_2Cl \quad (1)$$

Then, this 1, 2 dichloroethane is processed in a variety of ways to yield the VCM. The three most significant processes in order of common usage are:

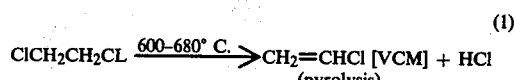

1,2 dichloroethane→vinyl chloride monomer+hydrocloric acid (1')

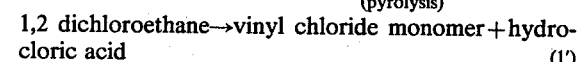

$$CH_2=CHCl + NaCL + HOH$$
(caustic soda treatment)

1,2 dichloroethane+sodium hydroxide→VCM+sodium chloride+water (2')

CH≡CH+HCl→CH₂=CHCl (acetylene synthesis) (3)

acetylene+hydrochloric acid→VCM (3')

The output of chlorine gas from the irradiation of vinyl chloride wastes in the influent can be recycled into the first reaction. Any hydrochloric acid, which is a logical state of chlorine gas in water, can be fed into reaction pathway #3.

It has been demonstrated that activated hydrogen ions (H*) that are produced in the irradiators 42 and 52 will rip chlorine gas molecules apart and result in hydrochloric acid and activated chlorine atoms (Cl*). These activated chlorine atoms in turn will attach any free hydrogen and produce another molecule of hydrochloric acid and another activated hydrogen atom (H*) which starts the whole cycle over again. The hydrochloric acid can be used in reaction #3 as follows:

$$H^* + Cl_2 \rightarrow HCl + Cl^* \quad (5)$$

$$Cl^* + H_2 \rightarrow HCl + H^* \quad (6)$$

The energy needed for this process is somewhere between 50–100 kilo-calories/gram-mole.

Figure 6:
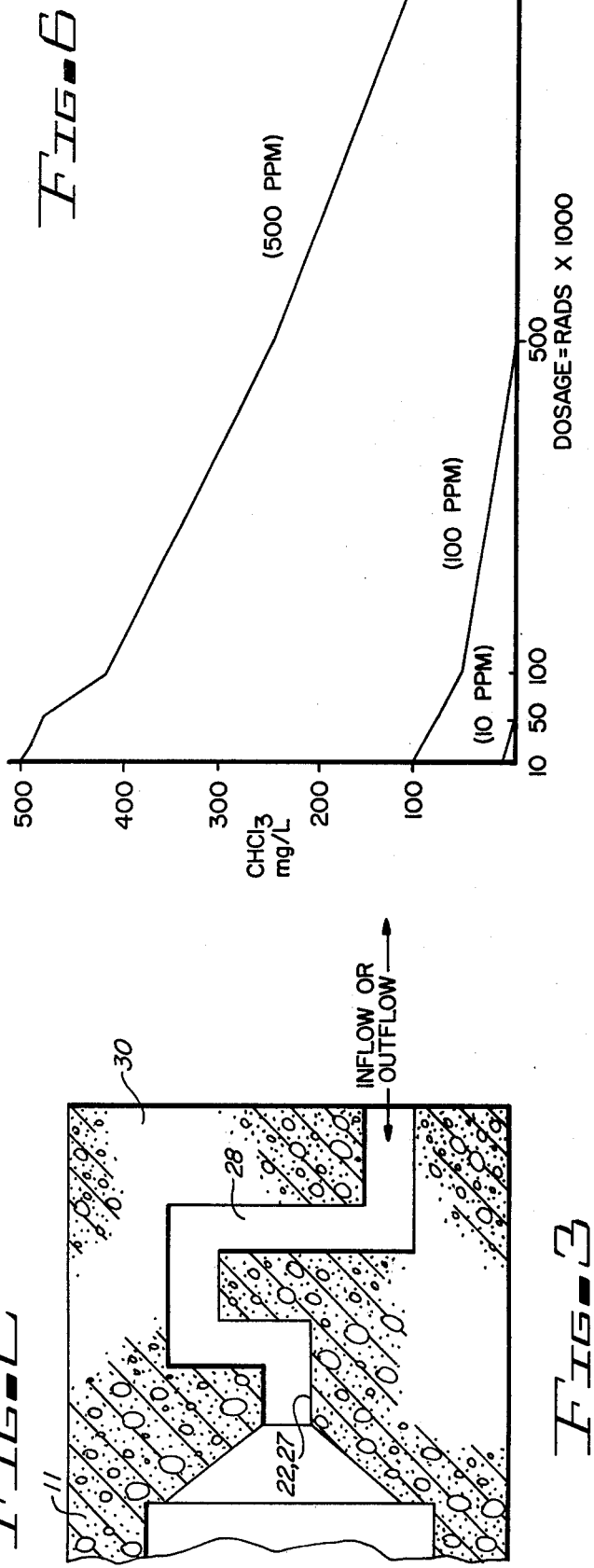
FIG. 6 is a chart showing the effects of irradiation on aqueous solutions of chloroform.

FIG. 6 shows a chart of the effects of irradation on aqueous solutions of chloroform. FIG. 5 shows a modified process having the irradiator 50 having an input of chlorinated phenolic waste from a production chain process 51 which passes through the irradiator which has a gas input line 52 for feeding ozone, oxygen, air or chlorine into the irradiator. The irradiator 50 has an effluent output 53 and a feedback output 54 for feeding chlorine (Cl₂), ethane (CH₃CH₃) and methane (CH₄) gases back to the production chain processes 51. The production chain processes 51 has a water output 55 and produces a chlorinated phenolic product at the output 56. Reactant materials are fed to the input 56 which combined with the feedback from the irradiator 50 for reusing the gases collected from the irradiator.

It should be clear at this point that an irradiator and gaseous/liquid contact apparatus and method have been provided. It should also be clear that the apparatus and method are not intended to be limited to the embodiments shown, which are to be considered illustrative rather than restrictive.

I claim:

1. An irradiator apparatus comprising in combination:
   a casing having an input thereinto and an output therefrom;
   a plurality of connected chambers formed in said casing by walls formed in said casing;

at least one gamma radiation source located in a plurality of said chambers to form a plurality of irradiation chambers;

said plurality of chambers including at least one gas treatment chamber, the walls between said gas treatment chamber and said irradiation chamber being a gamma radiation blocking material;

a gas input line connected to said gas treatment chamber for feeding a gas thereto; and gas escape means for allowing the escape of gas from said plurality of chambers, whereby a fluid can be treated with a series of gamma radiation and gas contact treatments.

2. An irradiator apparatus in accordance with claim 1, including a plurality of irradiation sources located in each irradiation chamber to evenly distribute the irradiation throughout the chamber.

3. An irradiator apparatus in accordance with claim 1, including means to capture gas from said irradiator.

4. An irradiator apparatus in accordance with claim 3, including means to react said captured gas from said irradiator with at least one other material.

5. An irradiator apparatus in accordance with claim 4, including a gas input to each of said irradiator chambers for feeding at least one other gas thereto.

6. An irradiator apparatus in accordance with claim 5, in which each gas treatment chamber is connected to an ozone line for feeding ozone thereinto.

7. An irradiator apparatus in accordance with claim 6, in which said gas input line has a plurality of outputs into said gas treatment chamber for providing a greater liquid/gas contact in said chamber.

8. An irradiator apparatus in accordance with claim 7, in which at least one irradiator chamber is connected to a chlorine source for feeding chlorine into said irradiation chamber.

9. An irradiator apparatus in accordance with claim 7, in which the gas line to at least one irradiation chamber is connected to a source of oxygen for feeding oxygen thereinto.

10. An irradiator apparatus in accordance with claim 7, in which said gas input line to said irradiation chamber includes a source of air connected thereto for feeding air into said irradiation chamber.

11. An irradiator apparatus in accordance with claim 7, in which the gas input into said irradiation chamber has a plurality of openings into each chamber for producing greater contact between the gas and the liquid in said chamber.

12. An irradiator apparatus in accordance with claim 7, in which said gas escape means includes a plurality of gas passageways through said casing connected to pipes for capturing gas fed therethrough.

13. The method for the treatment of a fluid including the steps of:

irradiating fluid from the output of an industrial process in an irradiator to produce dissociated fluids from the molecular dissociation of said waste fluid;

collecting at least one said dissociated fluids from the molecular dissociation of said waste; and feeding said collecting dissociated fluid from the molecular dissociation of said waste back into the production chain process of an industrial plant from which the waste was received, whereby a portion of the waste of an industrial plant can be reused by the industrial plant.

14. The method in accordance with claim 13, including the step of feeding ozone into the irradiator in a chamber separate from the radiation sources, whereby the irradiated fluid is simultaneously treated with ozone.

15. The method in accordance with claim 14, including the step of feeding ozone and air into said irradiator.

16. The method in accordance with claim 13, including the step of feeding chlorine into said irradiator for a combined dissociation of waste fluid by chlorinating and irradiating the fluid.

17. The method in accordance with claim 13, including the step of feeding nitrogen into said irradiator while said waste fluid is being irradiated.

* * * * *